CHARACTER READING SYSTEM

Filed June 21, 1960 4 Sheets-Sheet 1

INVENTOR
Kenneth W. Heizer

BY Stevens, Davis, Miller & Mosher
ATTORNEYS

INVENTOR
Kenneth W. Heizer
BY
Stevens, Davis, Miller & Mosher
ATTORNEYS

INVENTOR
Kenneth W. Heizer

BY Stevens, Davis, Miller & Mosher
ATTORNEYS

INVENTOR
Kenneth W. Heizer
BY Stevens, Davis, Miller & Mosher
ATTORNEYS 3,111,647

CHARACTER READING SYSTEM

Kenneth W. Heizer, Dallas, Tex., assignor, by mesne assignments, to Sperry Rand Corporation, Manhattan, N.Y., a corporation of Delaware Filed June 21, 1960, Ser. No. 37,671
12 Claims. (Cl. 340—146.3)

The present invention relates to a method and apparatus for identifying intelligence-bearing characters. More specifically, the invention relates to improved apparatus for reading printed characters as they pass in groups before the sensing means and for providing an output signal indicative of the characters read capable of actuating various output devices such as electric typewriters, card punching machines, tape punching machines or other machines capable of receiving information.

Although several devices are presently known for reading printed characters, the present invention may be readily distinguished from, and is an improvement over these devices in one or more material aspects. Whereas most reading devices known to the art are critically dependent upon proper vertical alignment of the individual characters with respect to one another or with respect to some reference line, the present invention is completely independent of the vertical alignment of the characters to be read and is capable of recognizing them regardless of their position as long as they do not overlap characters in adjacent horizontal rows or fall outside of the field of view of the sensing means.

Another advantage of the present invention lies in its mechanical simplicity and relative freedom from moving parts which results from the use of electronic scanning. As will be presently disclosed, the use of electronic scanning also permits a resolution of such an order as to permit the identification of characters of substantially less than perfect formation due to smudges or poor imprinting that results in unequal line segment widths or almost missing character elements.

It is, therefore, a principal object of this invention to provide a method and apparatus of the type generally referred to above for the reading and interpreting of various printed characters.

It is a further object of this invention to provide a method and apparatus for the reading of printed characters independent of critical alignment requirements of the characters to be read.

A still further object of this invention is to provide means for scanning characters to be read electronically without moving mechanical parts and without a scanning light beam.

Other and further objects, advantages, and characteristic features of the present invention will become readily apparent from the following detailed description of a preferred embodiment of the invention when taken in conjunction with the appended drawings in which.

Figure 1:
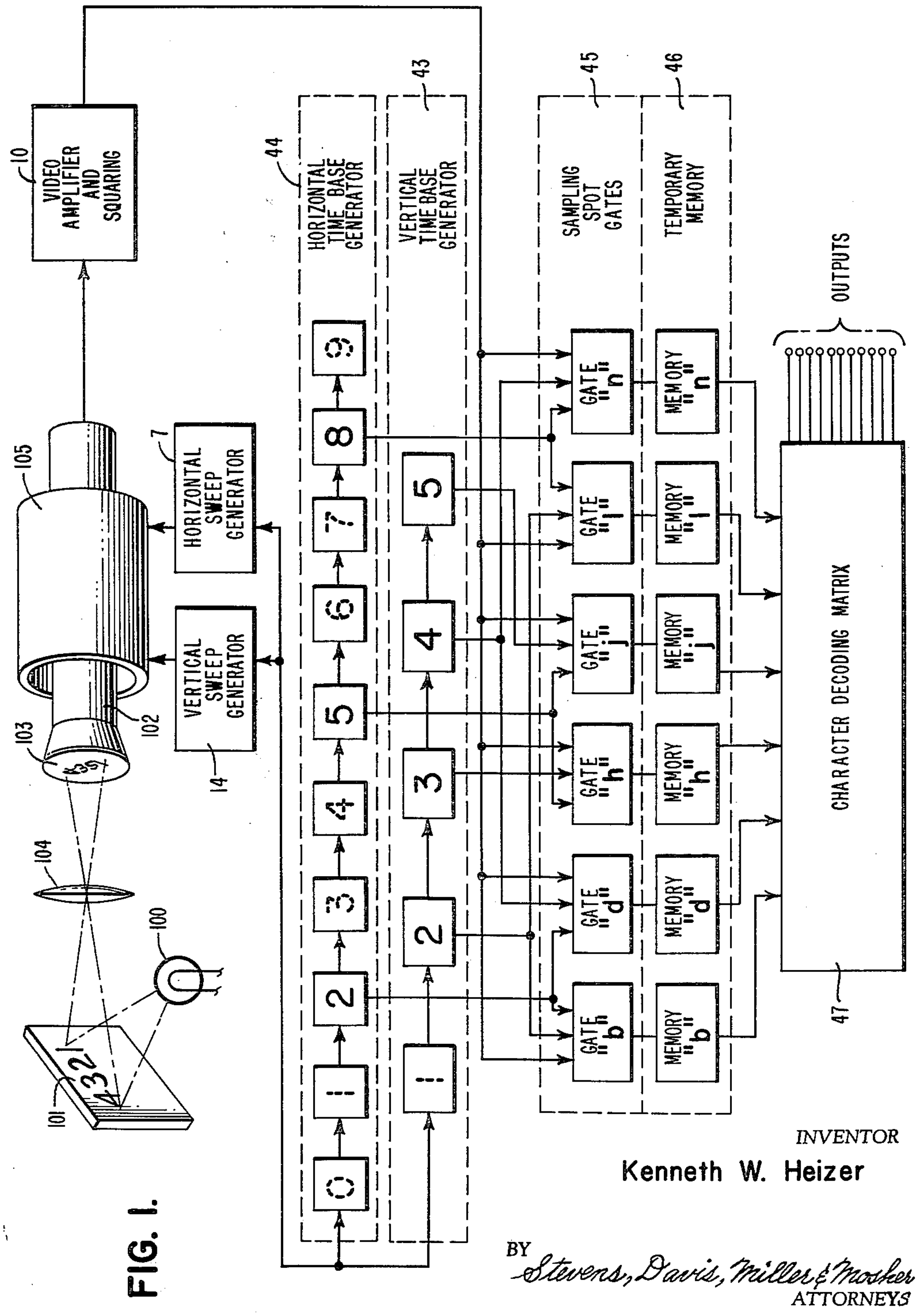
FIGURE 1 is a simplified block diagram of the character reading system provided by the present invention.

Referring now to FIGURE 1, the system operates as follows. Assume that means are provided to present the material to be "read" to the camera in incremental groups of characters and that such a group, to be presently considered, is properly positioned within the field of view of the camera. A lens focuses an image of the entire group of characters to be read onto the face of a vidicon (television camera tube). The face of the vidicon is scanned from within the tube by an electron beam that is driven, in a typical scanning raster, progressively across the scanning field in a series of vertical scans. The scanning raster is developed by two separate sweep generators which produce, respectively, the relatively rapid vertical sweep and the slower horizontal sweep.

The electrical current in the target electrode is affected by whether the scanning beam is swept over "dark" or "light" portions of the vidicon face (i.e., whether the portions are within the dark image of a character or in the lighter background or vice-versa). Thus, a signal can be developed which indicates the passage of the beam over portions of the character images.

This video signal is then processed in a video amplifier to obtain a square wave signal. The square wave results because the relatively slow change of the video signal level from the reading of "dark" to a reading of "light" is fed into a Schmitt trigger circuit (located in the video amplifier), from whence it emerges as a signal comprised of two voltage levels only. Thus, a zero voltage output might be obtained for "light" (white) video signals and all "gray" or doubtful signals up to a certain preset point at which the trigger would respond and produce an output voltage indicative of "dark" video signals. It may be seen that it becomes an easy matter to make the preselected trigger point automatically responsive to changes in background illumination or signal contrast to provide the best output signal possible over a wide range of conditions.

The square wave signal is applied to a gating circuit which permits the passage of video information during vertical sweeps of the scanning beam in one direction only, blanking the video signals in sweeps of opposite direction.

The video signal that remains is then ready for the interpreting circuitry. The rather unique principles upon which recognition of characters is based in this apparatus make use of certain preselected stroke differences between the various characters to be read. Through a technique of spot sampling of the area in which the character occurs, any character can be recognized and distinguished from other characters by making use of the various distinctive characteristics borne by each character. Thus, by a proper selection of a pattern of sampling spots within the character area, characters may be distinguished one from the other by a comparison of the "dark" or "white" condition of the video signal at the various sampling spots with known patterns of "dark" and "white" spots peculiar to each character.

Since the video signal is examined at certain discrete points only, there must be further gating of the video signal. Means for properly timing the gating of the video signal, so that it may be examined only at the various selected sampling spots, are provided in the form of horizontal and vertical timing generators which (by dividing the time taken by each vertical scanning sweep inside the vidicon into a predetermined plurality of increments and by selecting only a predetermined few of the vertical sweeps for consideration) provide a subdivided raster consisting of a rectangular array of timed intervals equal in number to the number of increments into which each vertical sweep is subdivided. It may be seen that the use of even a relatively small number of vertical and horizontal divisions of the scanning raster will result in a number of spots in the array that is considerably greater than the number required for reliable identification of the characters. (An array making use of just four vertical sweeps and dividing these sweeps into five vertical increments results in an array of twenty spots, which is more than enough to accurately distinguish all the English letters and numerals.)

A plurality of electrical sampling spot gates is provided in which the various horizontal and vertical timing signals are combined to establish the active sampling spots to be used for character identification. Thus, any individual gate will be "open" only when the respective horizontal and vertical time signals are concurrently present at that particular gate. The video signal is also applied to each of the sampling spot gates, and any individual gate will give an output only during the simultaneous presence of a horizontal time signal, a vertical time signal, and a video "dark" signal.

In order that the conditions of each of the sampling spot gates may be "remembered" until the scanning of an individual character is complete, a plurality of settable means having two stable conditions are provided. Although these are shown as a plurality of electronic flip-flop circuits, any dual state device (such as thyratron tubes, electric relays, magnetic cores, etc.) could be employed with equal effectiveness. The gate outputs are each associated with a corresponding flip-flop input so that a "dark" video signal appearing at an "open" gate will "flip" the associated flip-flop circuit, whereas a "white" signal will not. Thus, when the scanning of the character is complete, the flip-flop circuits will each indicate the "dark" or "white" condition of the card at each respective sampling spot within the area of the character.

The outputs of the flip-flop circuits are each connected to the input lines of a diode matrix which provides an output indicative of the character read for each valid combination of "dark"-reading and "white"-reading flip-flops. The matrix, therefore, is seen to operate as a decoding element between the code developed through reading a character as a combination of "dark" and "white" spots and the single wire output for each character to be read.

Figure 2:
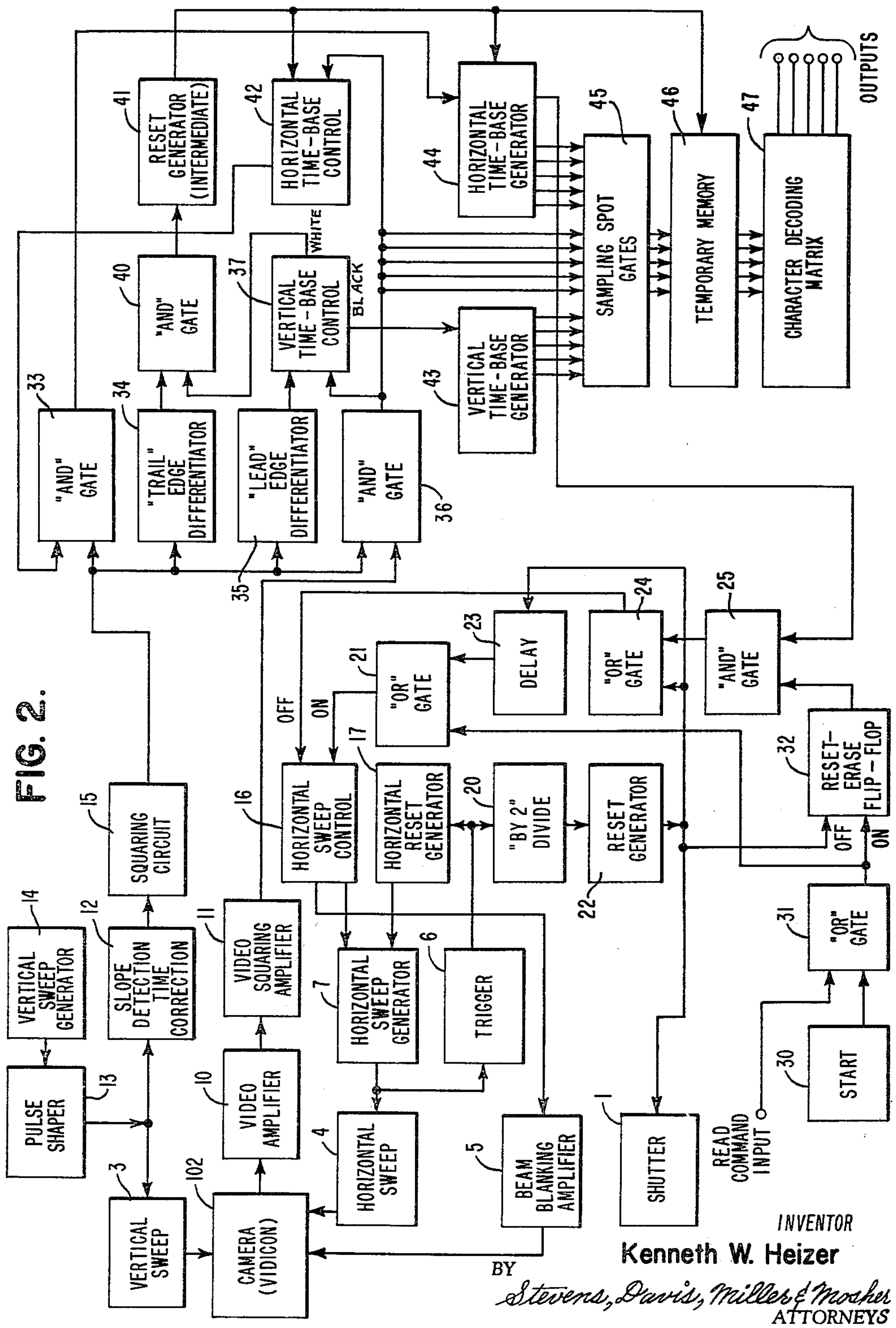
FIGURE 2 is a more detailed block diagram of the electronic circuitry used in the system of FIGURE 1.

Referring to FIGURES 1 and 2 and considering the system in more detail, the character-bearing material and the means provided to present the material to the field of view of the camera will now be considered. Although these means are not part of this invention, it should be understood that such means should be capable of holding the material to be read and advancing the material horizontally along the lines of printing and vertically from one line to the next, should there be no more than a single line of printing on each item to be read. Thus, if the character bearing items were cards of the type in which information may be recorded in the form of punched holes, the card feed mechanism of a card punching machine could well serve as handling means for the reading operation as well if it would be desirable to punch into the card the same information contained thereon in the form of printed characters. If the material to be read is in the form of multiple lines of printing on pieces of paper, the carriage and associated advancing mechanisms of a conventional electric typewriter could be used conveniently to obtain both the horizontal and the vertical feed of the paper.

It should be noted that in order to obtain the greatest operating speed possible with this invention the feed mechanism should be capable of presenting the characters to be read to the field of view of the camera in groups. (The optimum number of characters to be included in each group may be determined as indicated hereafter considering the size and style of the characters.) It should be noted that the precise means for holding the cards or paper to be read is unimportant and, therefore, no particular means will be shown in the drawings.

A light source 100 is provided to illuminate an area on the material 101 to be read. The illuminated area is at least as large as the series of characters that will be read as any single group. An image of the illuminated digits to be read as a group is focused onto a light-sensitive face 103 of a vidicon tube 102 by an appropriate lens 104. An iris diaphragm (not shown in the drawings) may be provided in conjunction with the lens 104 to permit optimum exposure of the vidicon face 103. A simple shutter mechanism (also not shown in FIGURE 1) is interposed between the lens 104 and the face 103 of the vidicon tube 102. It should be understood that extraneous light from all sources except the light reflected from the card 101 through the lens 104 and through the open shutter is to be excluded from the face of said vidicon tube. The shutter may be of any of the types widely known in the art, the simple requirements being that it can be capable of producing uniform exposures of the order of one 50th of a second in response to an electrical signal from elsewhere in the system.

The camera tube, or vidicon, 102 may be of almost any of the types ordinarily employed in industrial television applications. It is preferred, however, that the tube have a persistence slightly higher than tubes used in the average television camera, since the reading system herein disclosed anticipates that (after a single brief exposure to an entire group of characters) the vidicon be capable of retaining the image of these characters throughout the time required for each to be scanned and recognized.

The scan-producing, or sweep, voltages are generated in much the same manner as in any television camera system well known to those skilled in the art. The vertical and horizontal sweep voltages are applied to the deflection coils 105 disposed around the tube 102. Preferably, the vertical sweep voltage is generated as a sawtooth voltage and is then amplified in a conventional manner to the level necessary to obtain the desired sweep amplitude of the electron beam inside the vidicon tube 102. For this purpose a vertical sweep generator 14 (FIGURE 2), which includes a free running multivibrator, is provided, the output of which after being made more nearly linear in a pulse shaper 13, is fed to a vertical sweep amplifier 3, which provides the vertical sweep voltage for the camera 102. It is desirable, as will be seen later, to provide means for adjusting the frequency of the vertical sweep oscillator 14.

As will be seen presently, it is required that the horizontal scanning system be provided with means whereby the horizontal sweep may be stopped and started at a plurality of points along a single sweep. The horizontal sweep voltage employed is a stepped ramp, which may be generated by a Miller-type integrator circuit controlled by a flip-flop. These elements are shown as the horizontal sweep generator 7 in FIGURE 2. The output of the horizontal sweep generator 7 is fed to a horizontal sweep amplifier 4 which increases the amplitude of the horizontal sweep signal to the extent necessary to provide a voltage capable of producing the desired beam sweep (horizontal) within the vidicon, or camera 102.

A horizontal sweep control circuit 16 is provided for the aforementioned stopping and starting of the horizontal sweep. As was also previously described, this control circuit may consist of a flip-flop circuit having an appropriate output which is fed to the horizontal sweep generator 7 to provide the desired control. A second output of the horizontal sweep control circuit 16 can be used to provide blanking of the vertical sweep during such time when the horizontal sweep is stopped. For this purpose a beam blanking amplifier 5 is connected between the horizontal sweep control 16 and the vidicon 102. If the beam blanking amplifier 5 were not provided, the vertical sweep (sweeping repeatedly over a single vertical line during such times when the horizontal sweep were stopped) would "burn" the vidicon tube, thus permanently damaging it. The resetting of the horizontal sweep generator 7 is accomplished by the horizontal reset generator 17. A trigger circuit 6 provides the initiating pulse to the reset generator 17 automatically when the horizontal sweep reaches its maximum deflection. As may be seen from FIGURE 2 the reset pulse from the trigger circuit 6 is also fed to a division circuit 20 which produces one output pulse for every two pulses fed into it.

The division circuit 20 preferably consists of a flip-flop circuit connected as a counter. The output from the divide-by-two circuit 20 is used to trigger a reset generator 22, which consists of a one-shot multivibrator circuit. The key requirement for the multivibrator is that, when triggered by a single short pulse, the circuit will provide a large output pulse of a given length. The output of the reset generator 22 is fed to the shutter 1 disposed between the lens 104 and a vidicon 102, the divide-by-two circuit 20, an "OR" gate 24 and a delay circuit 23.

A start circuit 30 is provided to initiate the operation of the system and preferably consists of a push button which, when depressed, fires a Schmitt trigger circuit giving a sharp output pulse. The output pulse from the Schmitt trigger is fed to one input of an "OR" gate 31. As is well known in the art, an "OR" gate is a circuit in which the presence of a signal on any of several inputs will produce a corresponding output signal. An "AND" gate, on the other hand, is a circuit from which an output is obtained only at such times when signals are present on all of the inputs to the gate. The output of "OR" gate 31 is fed to a reset-erase flip-flop circuit 32 and also to an "OR" gate 21. The output from the reset-erase circuit 32 is fed to an "AND" gate 25. A second input to "AND" gate 25 is taken from horizontal time base generator 44. The output of "AND" gate 25 provides one of the two inputs to the "OR" gate 24 which, as was seen previously, is also controlled by the reset generator 22. The output of "OR" gate 24 provides, in turn, one of the two control inputs to the horizontal sweep control flip-flop 16. The other control input to the sweep control 16 is taken from the "OR" gate 21. The two inputs to the "OR" gate 21 are fed respectively by "OR" gate 31 and by delay circuit 23. The delay circuit 23 may consist of a one-shot multivibrator, delay line or other device of providing an output pulse at a given interval following the application of an input pulse and is utilized here to provide a delayed pulse in response to the triggering of the reset generator 22.

Returning now to the circuitry associated with the vertical sweep, the output of the pulse shaper circuit 13 is fed through a slope detection-time correction circuit 12 to a square wave-forming circuit 15, in addition to being applied to the vertical sweep amplifier 3. The circuit 15 may be an ordinary squaring amplifier or, better still, a Schmitt trigger circuit. The output from the circuit 15 is fed to an "AND" gate 33, a trailing edge differentiator circuit 34, a leading edge differentiator circuit 35 and "AND" gate 36. The differentiator circuits 34 and 35 are simply ordinary differentiator circuits modified to give an output pulse when positive going and negative going input pulses, respectively, are received. Thus, the trailing edge differentiator 34 produces an output pulse of short duration at the end of a substantially longer input pulse from the circuit 15, while the leading edge differentiator 35 produces a short output pulse at the beginning of an input pulse received from the circuit 15.

The output of the leading edge differentiator 35 is sent to a vertical time base control circuit 37, the other input to the circuit 37 being taken from "AND" gate 36. The control circuit consists of a flip-flop, the outputs of which are fed respectively to an "AND" gate 40 and to a vertical time base generator 43. The output of "AND" gate 40 triggers a one-shot multivibrator used as an intermediate reset generator 41. The intermediate reset generator 41 is used to return a horizontal time base control 42, the horizontal time base generator 44, and the temporary memory circuit 46 to reset conditions. The horizontal time base control 42 consists of a flip-flop connected in much the same manner as in the vertical time base control 37 in that the two inputs to the horizontal time base control 42 are connected to "AND" gate 36 and the intermediate reset generator 41. The output of the circuit 42 is fed to a second input to "AND" gate 33.

The video signal from the camera 102 is fed to this portion of the system through "AND" gate 36. Interposed between the camera 102 and the gate 36 are a video amplifier circuit 10 (consisting of ordinary amplifier circuits) and a video squaring amplifier 11 which consists of either an ordinary squaring amplifier circuit or a Schmitt trigger circuit. As is perhaps more clearly shown in FIGURE 1, the horizontal time base generator 44 consists of a plurality of flip-flop circuits (or for that matter almost any other dual state device) in a ring connection whereby sequential pulsing of the first unit in the string produces an output which occurs first at the number 1 unit, then at the number 2 unit, etc. In FIGURE 1 nine flip-flops have been shown, one corresponding to each horizontal unit of measurement across an individual character as measured by the time for each successive vertical sweep of the character. Since this example anticipates that nine vertical sweeps will cover each individual character, nine flip-flops have been provided, but as only three of the nine vertical sweeps are to be examined for video information, the outputs of only three of the flip-flops will be utilized and fed to sampling spot gates 45. The vertical time base generator 43, as previously described, is comprised of a cascaded string of one-shot multivibrators of which only the last four units in the string will be utilized and fed to the sampling spot gates 45.

The sampling spot gates 45 consist of a plurality of ordinary "AND" gates, there being one gate provided for each sampling spot used in the character determination. The style of characters used in this example may be satisfactorily distinguished by the use of six discrete areas; hence, six gates are shown. Each "AND" gate has three inputs consisting of a vertical time base signal, a horizontal time base signal, and an input for the video signal. The output of each gate is fed to a temporary memory 46 for temporarily storing the information relating to the condition ("dark" or "white") of each sampling spot on a character as the spots are sequentially examined. The temporary memory 46 could consist of a delay line, thyratron tubes, magnetic relays, magnetic cores, etc.; however, for purposes of illustration individual flip-flop circuits are shown. The outputs of the memory 46 are fed to a diode matrix 47 in which the various combinations of "dark" and "light" sampling spots are decoded to determine the particular character represented thereby. A plurality of single wire outputs, one for each character to be recognized, is provided for connection to whatever output device is to be utilized.

The following description of the operation of the recognition apparatus assumes that means for properly presenting the character bearing materials to the field of view of the camera 102 have been provided along with a source of proper illumination.

The reading operation is initiated by manually depressing the start circuit 30. This causes an output pulse to be emitted from the start circuit 30, which after passing through "OR" gate 31 and "OR" gate 21, is applied to the "ON" input of the horizontal sweep control 16. It should be noted that the output of "OR" gate 31 is also applied to the input of the reset-erase circuit 32, thus turning on the reset-erase circuit 32, thereby providing an output signal which is fed to "AND" gate 25. However, unless a video signal is present in the system, the other input to the "AND" gate 25 will not be energized and hence, there will be no output from the gate 25.

The triggering of the horizontal sweep control 16 by the output of "OR" gate 21 presents a virtually instantaneous voltage level shift to the input of the horizontal sweep generator 7. The integrating action of the sweep generator 7 produces an output consisting of a ramp, or linearly changing voltage with respect to time. This signal is amplified in the horizontal sweep amplifier 4 and is applied to the horizontal deflection coils 105 associated with the vidicon tube 102. This initiates the first horizontal sweep of the electron beam across the face 103 of the vidicon 102. It should be understood that, since the voltage difference at the output of the horizontal sweep control 16 is the voltage to be integrated by the horizontal sweep generator 7, returning the horizontal sweep control to the "OFF" condition will halt the integrating action. However, the output level of the sweep generator 7 will for all practical purposes remain at the level at which the turning off occurred since the voltage difference in the reverse direction is much less than that present at the "turn on." Because of this greatly reduced voltage difference, any reverse integrating action (and consequent reverse sweeping) is so slight as to be inconsequential. In addition to initiating a horizontal sweep the triggering of the horizontal sweep control 16 also turns off the blanking amplifier 5, thus permitting the generation of a scanning beam within the vidicon tube.

It may be seen that the vertical sweep oscillator 14 begins producing a signal as soon as the power is turned on. Similarly, the pulse shaping circuit 13 and vertical sweep amplifier 3 remain in constant operation, the result being that the vertical sweep voltage is applied to the vertical deflection coils continuously, yet not until the horizontal sweep control 16 is triggered (turning the blanking amplifier off as the horizontal sweep is begun) can a beam be produced upon which the vertical deflection coils can operate. Note also that the shutter 1 has not been tripped, since the energizing signal for the shutter solenoid is obtained from the reset circuit 22 which is not triggered until two complete horizontal sweeps have occurred. This assures that operation of the system will not begin with a retained image remaining on the vidicon tube face from a prior exposure, the "dummy sweeping" effectively erasing any such image.

Since at this time there is no video output, the horizontal sweep generator 7 will reach its maximum output level corresponding to full horizontal deflection of the beam without interruption. Since the trigger circuit 6 is preadjusted to "fire" at this voltage level, an output pulse will be fed to the horizontal reset generator 17 and to the divide-by-two circuit 20 when the point of maximum horizontal beam deflection is reached. As soon as the reset pulse from the generator 17 returns the horizontal sweep generator 7 to its reset condition, a new sweep will begin because the sweep control circuit 16 remains in the "ON" state. At the point of maximum beam deflection on the second sweep a pulse will again be emitted from the trigger circuit 6 and this pulse is applied to the appropriate inputs of the horizontal sweep generator 17 and the divide-by-two circuit 20. Since this division circuit 20 produces an output at the end of the second horizontal sweep, a pulse will be fed from the circuit 20 to the reset circuit 22 at this time. The effect will be the generation of a reset pulse applied simultaneously to the reset-erase circuit 32, the shutter operating circuit 1, the "OR" gate 24 and the delay circuit 23.

The immediately obvious results of the generation of the reset pulse will be to operate the shutter mechanism (or "strobe" light), exposing the vidicon tube face 103 to the characters to be read, and to turn "OFF" the reset-erase circuit 32 which was turned "ON" by the original "start" pulse. In addition, the reset pulse from the generator 22 will, on passing through "OR" gate 24, return the horizontal sweep control circuit 16 to the "OFF" condition, thus preventing (for the present) the generation of another horizontal sweep. The reset pulse is also applied to the delay circuit 23 to produce an output pulse after the passage of a preselected time interval. The delayed pulse from the delay 23 will, after passing through "OR" gate 21, return the horizontal sweep control circuit 16 to the "ON" condition, thus initiating another horizontal sweep. The momentary delay between horizontal sweeps is introduced to permit operation of the shutter circuit mechanism 1 before the beginning of the "reading" sweep.

Returning to the vertical sweep-generating portion of FIGURE 2, it may be seen that the output of the pulse shaper 13 is fed through a slope detecting-time correcting circuit 12 as well as to the vertical sweep amplifier 3. The sweep amplifier 3 creates a signal that occurs simultaneously with the output of the video squaring amplifier 11 corresponding to any particular upward going vertical sweep. The output of the detecting and timing circuit 12, after passing through the squaring circuit 15, is used as a gating signal for the video information. Therefore, it is necessary that this output signal be coincident in time with the duration of the associated positive going vertical sweep. Thus, the circuit 12 performs the function of selecting the portion of the sawtooth sweep signal corresponding to a vertical sweep going from the bottom of a character image to its top and also shifting that signal to a point in time in which it is coincident with the corresponding video signal output of the video squaring amplifier 11.

It should be evident that no video signal will be produced and fed to "AND" gate 36 until the scan has progressed in successive vertical scans to the point where some image on the vidicon tube face is intercepted by the electron scanning beam. When an image is intercepted during a positive going vertical sweep, the corresponding video signal will be passed by "AND" gate 36 because of the simultaneous application of the video signal and the vertical sweep signal from the video squaring amplifier 11 to the two respective inputs of the gate 36. The output of "AND" gate 36 is applied to one input of the vertical time base control 37 and energizes the "black" output of the circuit 37. Note that since the "white" output of the circuit 37 is not energized, "AND" gate 40 is kept closed to the passage of pulses from the trailing edge differentiator circuit 34. The output of "AND" gate 36 is also applied to one input of the horizontal time base control 42, the output of which places "AND" gate 33 in an "ON" condition to allow passage of the squared vertical sweep signal from the circuit 15 to the input of the horizontal time base generator 44. The video signal is also applied to the video inputs of the sampling spot gates 45, of course.

Summarizing, the net effect of the first bit of video information passing through "AND" gate 36 is to step the horizontal time base generator 44 by one unit (from state "0" to state "1") by turning "ON" the horizontal time base control 42 and to initiate the automatic stepping of the vertical time base generator 43 by switching the vertical time base control 37 to the "black" condition. Inasmuch as the state "1" output of the horizontal time base generator 44 is not used in the creation of any sampling spots in this example, none of the video information generated in the first vertical sweep will be passed to the temporary memory 46 for storage.

One of the error-recognizing features of this invention might best be examined at this time. If, one the second vertical sweep (or any sweep for that matter after the first but before the last over a given character image) no video information is received, it might be suspected that the video information generated on the preceding vertical sweep was precipitated by a spot of irrelevant printing, and hence, it would be desirable to reset the circuitry for recognition of an actual character image when such is intercepted by the scanning beam. For this purpose the leading and trailing pulse edge differentiators 35 and 34, respectively, have been provided. The steep leading edge of every squared vertical sweep signal produces an output pulse from the leading edge differentiator 35 which switches the vertical time base control 37 to a "white" output state, and the circuit 37 remains in this state until some bit of video information is received through "AND" gate 36, at which time the circuit 37 is returned to a "black" output condition. However, if an entire vertical sweep is made in which no video information is received, the vertical time base control 37 will remain in the "white" output condition and thus leave "AND" gate 40 open for the passage of a pulse from the trailing edge differentiator 34. The steep trailing edge at the end of a squared vertical sweep signal produces a pulse in the trailing edge differentiator 34 which will pass through the "AND" gate 40 under the conditions just described and consequently trigger the intermediate reset generator 41. The output of the generator 41 is applied to appropriate inputs of the horizontal time base control 42, the horizontal time base generator 44 and the temporary memory 46 to return these circuits to the reset condition and prepare them for the reception of more video information at such time when the scanning beam should next intercept an image.

Returning now to the scanning of a valid character image, the number "2" state of the horizontal time base generator 44 is employed in the creation of sampling spots. Assume that on the second vertical scan video information is received through "AND" gate 36. This switches the vertical time base control 37 to the "black" condition, thereby starting the stepping of the vertical time base generator 43 and also switching the horizontal time base control 42 to the "ON" condition to effectively step the horizontal time base generator 44 to the number "2" state. The application of the received video information to the proper inputs of each of the sampling spot gates will then make possible the determination of the printed or unprinted condition of each of the selected sampling spots on the character being scanned.

The operation of the sampling spot gates 45 is no different from that of any "AND" gate. Hence, by connecting one output of the horizontal time base generator 44 to one input of a gate and one output of the vertical time base generator 43 to a second input of that gate, the gate will be "open" to the passage of video information applied to the third input of that gate only during the time that both the horizontal and vertical time base generators are in the respective conditions in which output signals are present on the stages connected to that particular "AND" gate. In this manner the "black" or "white" condition of the video signal resulting from the scanning of a "printed" or "not printed" segment of a particular character is related to the precise location within the total area of a character in which the segment occurs. Hence, it is seen that the timing of the vertical time base generator 43 is critical, because the individual units comprising the generator 43 must be adjusted to remain in the "ON" condition for approximately the same length of time that is required for the scanning beam to cover vertically the vertical increment represented by the output of each particular vertical unit. It is also necessary for the vertical scan to progress horizontally during each vertical cycle by an increment equal to that represented by each unit of the horizontal time base generator 44. However, this requirement is to be distinguished from the more important one of the electron beam scanning one complete character in precisely the desired number of vertical sweeps (nine sweeps are used with the type font shown). This latter condition, a function of the actual size of the character image on the vidicon tube face for any particular type font, is met by correctly setting either the time rate of change of the voltage applied to the horizontal deflection coils (and, hence the velocity of the horizontal sweep) or the frequency of the vertical sweep oscillator 14.

Figure 5:
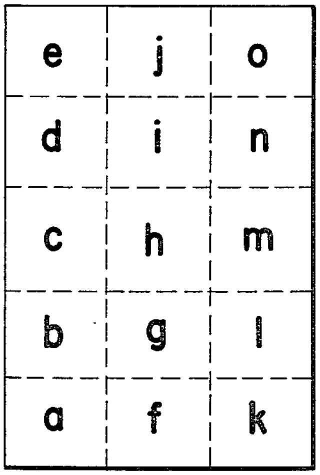
FIGURE 5 shows the pattern of sampling areas used in identification of the type font shown in FIGURE 3.

In FIGURE 1 the individual sampling spot gates 45 are shown with the input connection combinations necessary to permit these gates to properly represent the sampling spot areas depicted in FIGURE 5 by the corresponding letter designations. It should be remembered that the squared vertical sweep signals and the "dark" video signals must be concurrently present on the respective inputs of "AND" gate 36 before the vertical time base control 37 will be triggered to "black," thus initiating the sequential firing of the vertical time base generator 43. Obviously, then the vertical time base generator 43 cannot be triggered until a vertical sweep has intercepted some printed portion of a character.

Figure 3:
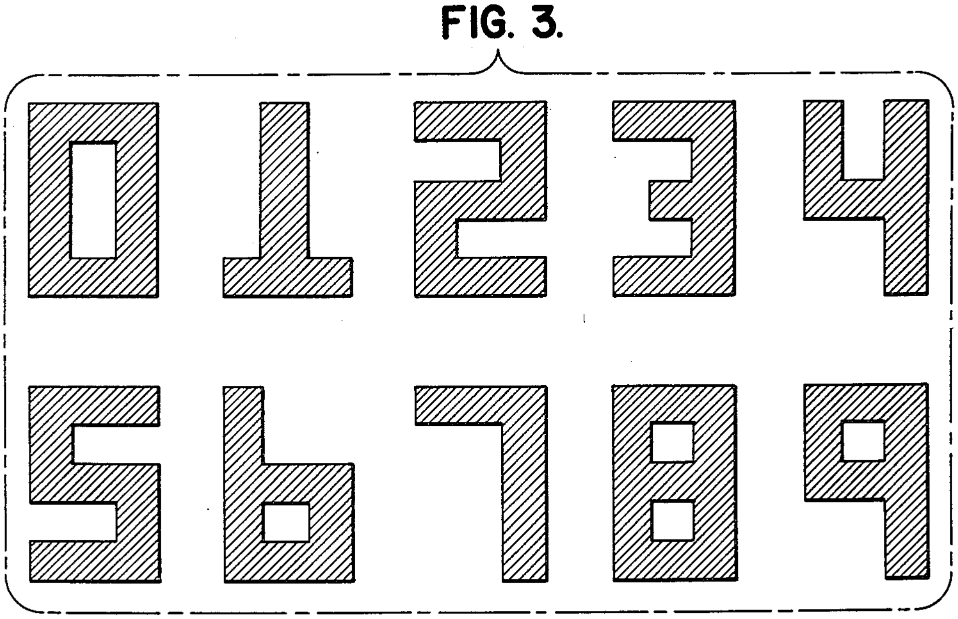
FIGURE 3 shows an example of type font capable of being identified by the apparatus.
Figure 4:
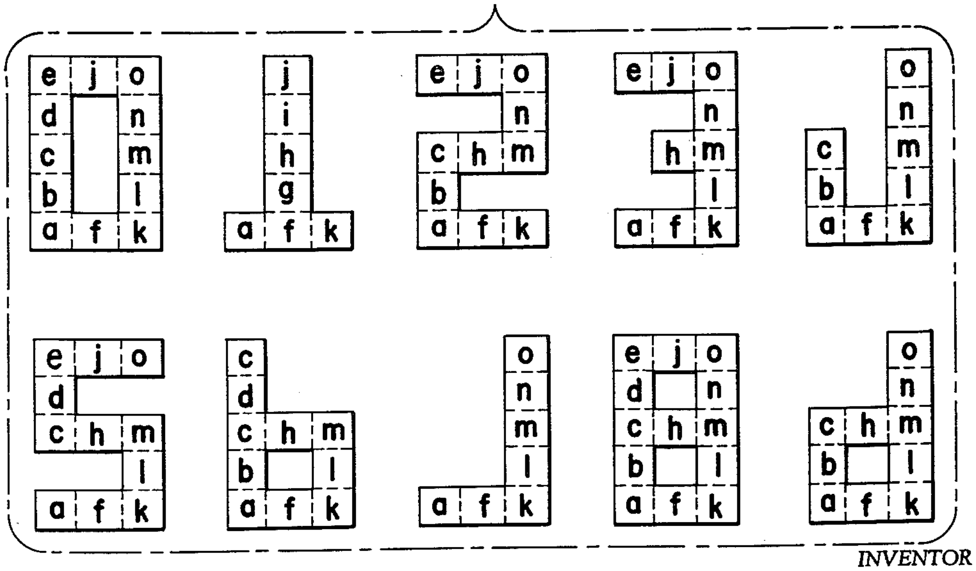
FIGURE 4 shows an example of the type font of FIGURE 3 as modified by the recognition circuitry prior to identification.

It thus becomes apparent that all of the individual elements which make up each character are related vertically (in an individual vertical scan) to the first element intercepted in that scan by the scanning beam and, in turn, are related as a group to the first vertical recognition division. For this reason, the characters, the images of which would appear on the vidicon tube face as shown in FIGURE 3, are represented for purposes of recognition as shown in FIGURE 4. It will be noted that those characters not having continuous strokes completely across the bottom of the character width will be recognized according to a pattern not consistent with the actual shape of the character. According to this pattern any vertical column of elements in which no element occurs in the first vertical division will be considered as occurring in whatever position is necessary to cause the first occurring element (as related to the bottom of the character) to fall within the first vertical division. As seen in FIGURE 3, the numerals "4," "7" and "9" fall into such a class. FIGURE 4 shows these same characters on the basis by which they would actually be recognized, those vertical columns of said characters in which no element exists in the first vertical division being "lowered" to the point necessary to cause the first occurring vertical element to fall into the first vertical division. As long as this problem is recognized and understood, no difficulty will be had in setting up the apparatus to identify any type of character if enough vertical and horizontal elements are employed and no characters in the particular font of type to be "read" happen to become identical when the "modification" operation occurs. Note the possibility, however, of confusing a lower case "*d*" with a modified figure "9" in some type fonts. Note also that this danger would be no greater than the like possibility of confusing a lower case "*b*" with a figure "6" even though no modification is made on either character.

Continuing with the operation of the apparatus, the output of each of the sampling spot gates 45 is connected to the input of a temporary memory unit 46 in which the "printed" or "not printed" condition of each sampling spot, as determined by the gate representing said spot, can be stored or "remembered" until scanning of the entire character is complete. This storage is made necessary by the fact that each of the sampling spots is examined sequentially, and the condition of each spot is available for use for only a brief period of time. However, recognition of the character demands that the total configuration of the character be known and available for examination at a single point in time. As was stated previously, the exact nature of the memory device employed is unimportant, but for purposes of this description the use of flip-flop circuits will be assumed.

As each individual sampling spot gate 45 produces either an output or no output, the associated memory flip-flop will correspondingly be "flipped" or "not flipped" to indicate the "printed" or "not printed" condition of the area on the character image to which each gate and flip-flop relates. As indicated previously, the output lines of the various temporary memory units 46 are selectively combined in an ordinary diode matrix, such as is well known to the art. In the character decoding matrix 47 the various unique combinations of sampling spot conditions are equated with those patterns known to be representative of certain characters. The matrix 45 is provided with a single wire output for each character to be recognized. In addition, an "error" output is provided which is energized when an unidentifiable character is scanned.

Figure 6:
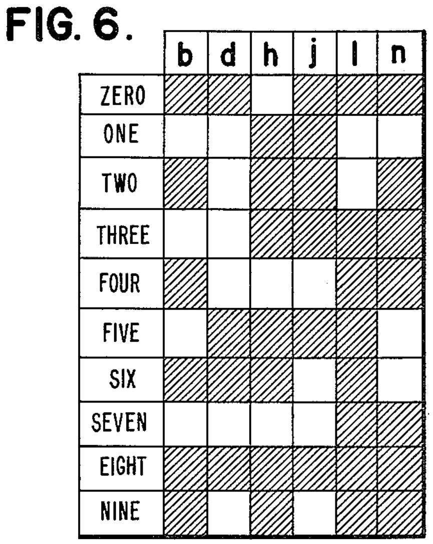
FIGURE 6 illustrates the sampling areas of FIGURE 5 as applied to each of the characters of FIGURE 4 and the code by which the characters may be identified.

As noted previously, FIGURE 5 shows a grid of fifteen areas, of which six may be used for identification for the particular characters of the type font illustrated in FIGURE 3, the six areas used being those that are shaded. FIGURE 6 shows how each character, when examined as described herein, may be represented as a single unique combination or code consisting of a "black" or "white" condition of each one of the six areas of FIGURE 5 as applied to the "modified" characters of FIGURE 4.

Returning now to the reading sequence, when a character image is encountered by the scanning beam, the video signal resulting therefrom will trigger the time base circuits. This will, barring the intermediate occurrence of a vertical scan during which no video signal is obtained, proceed to step through the scanning period of one complete character (nine vertical scans). An output on the last (ninth) unit of the horizontal time base generator 44 is fed, as one of two controlling inputs, to "AND" gate 25. It will be recalled that the other input to the gate 25, is applied from the output of the reset-erase circuit 32 which has remained in the "ON" condition since the initiation of the reading cycle resulting from the "start" pulse generated by the start circuit 30. Thus, "AND" gate 25 will be "open" to the pulse from the last stage of the horizontal time base generator 44 permitting this pulse to pass through to "OR" gate 24, whose output is fed to the "OFF" input of the horizontal sweep control 16. In this manner the horizontal scan is halted after the completion of the scanning of the first (and every other) character. Note that the next vertical sweep made will produce no video signal and the intermediate reset operation will occur as described before.

The output of the matrix 47 is connected to an output device (not shown) which is capable, when it has "digested" the first character read, of providing a "read" pulse indicating that the system is ready to receive the next character. The "read" pulse is received at the point in FIGURE 2 marked "read command input" and is fed to "OR" gate 31, the output of which places the reset-erase circuit 32 in the "ON" condition and, after passing through "OR" gate 21, causes the restarting of the horizontal scan by resetting the horizontal sweep control circuit 16 to the "ON" condition.

In the above-described manner each character in the group, the images of which are present on the face of the vidicon tube 102, is read in sequence, the horizontal scan stopping between characters until the output device is ready to receive the next reading. After the last character in an image group is read, the feeding in of another "read" pulse will cause the horizontal scan to sweep to the point of maximum deflection, at which point the trigger circuit 6 will reset the horizontal sweep generator 7 for the erase scan as previously described. At the conclusion of the erase scan, circuit 22 will be triggered, opening the shutter, and thus beginning the reading of a new character group, assuming, of course, that the new group has replaced the original group in the field of view of the camera. It has been assumed that the handling apparatus for the character-bearing material is capable of presenting the characters to be read to the camera in groups. As can be seen from the above description, the apparatus is best adapted to the reading of characters appearing in the groups on individual cards. However, it can also be seen that it would be a relatively easy matter to adapt the device to the reading of ordinary typewritten material, reading an entire line of printing at a time either by using a vidicon tube of very high resolution or by restricting the length of the lines of printed characters to be read to a certain maximum number of characters, e.g. fifty.

Figure 7:
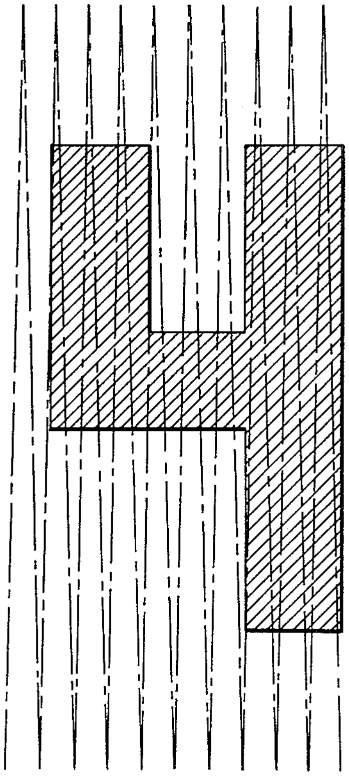
FIGURE 7 illustrates a typical character image with a characteristic scanning raster impressed thereon.

As was stated earlier the reading of characters may be accomplished substantially independently of the vertical alignment of individual characters one with another due to the scanning system employed in which the amplitude of the vertical scan on the face of the vidicon, being substantially greater than the height of individual characters, is capable of fully scanning the character image even though the image may occur considerably above or below the center line of the scan. As may be seen from FIGURE 7, the video signals generated by the scanning of the numeral shown would not be greatly altered if the image were displaced vertically, up or down, by a substantial amount. The amplitude of the vertical scan may be chosen by considering the anticipated amount of misalignment in the material to be read. Thus, the ratio of the scan shown in FIGURE 7 to the size of the numeral might be increased proportionately if seriously misalignment is anticipated. Inasmuch as the time base signals are initiated by the occurrence of video signals, it is seen that the timing circuits are likewise independent of character location. Thus, recognition may be made regardless of character position, provided only that the image of the character falls within the area actually scanned.

It should also be realized that the electro-mechanical shutter used for the timing of individual exposures of the vidicon tube could well be replaced by a system employing a high intensity light flash of short duration using techniques well known in the photographic art in connection with "strobe" lamps. The use of such a light, although requiring that the material to be read is substantially shielded from stray light, would provide the advantages of extremely short exposure times, thus permitting exposures of the vidicon while the material being read is in motion. The triggering of an electronic flash could be accomplished with little difficulty by the pulses from the reset generator 22 and the delay of the circuit 23 could then be substantially reduced in time constant or perhaps eliminated completely, depending on the particular technique employed in producing the light flash.

It should also be apparent that in the system of the present invention the vidicon tube serves as a "memory" in addition to performing the scanning function. After a single brief exposure to an entire group of characters, the vidicon tube retains the images of the characters for subsequent scanning, character by character, after the information-bearing material has passed on to a processing station. Moreover, the system employs simplified recognition circuity in which character identification is based on the "light" or "dark" condition of each one of a predetermined pattern of sampling spots on the character area. The pattern is such that it may be applied to each character to be recognized with equal effectiveness to derive the maximum amount of information from a minimum number of sampling points.

Although the present invention has been shown and described with reference to a particular embodiment, nevertheless, various changes and modifications obvious to those skilled in the art are deemed to be within the spirit, scope, and contemplation of the invention.

What is claimed is:

1. A system for identifying intelligence-bearing characters comprising means including a vidicon tube for sensing intelligence-bearing characters and for retaining the images of said characters for a predetermined time, scanning means in said vidicon tube for scanning said images retained on said vidicon tube and for furnishing video signals indicative of the characters scanned, means for interpreting said video signals to provide corresponding output signals indicative of the characters scanned, each character image area on said vidicon tube being divided into a plurality of sampling spots, and wherein said interpreting means includes means for determining whether an image is present in preselected sampling spots in said area and means for comparing the determined conditions of said preselected sampling spots with known conditions of said spots peculiar to each character, and timing means for generating gating signals for said video signals so that the video signals from preselected sampling spots only are examined, said sampling spots occurring in rows and columns and wherein said timing means includes first time base generating means for providing a signal indicative of the column in which the sampling spot presently being scanned by said scanning means occurs and second time base generating means for providing a signal indicative of the row in which the sampling spot presently being scanned occurs, a plurality of sampling spot gates, each having its inputs connected to said first time base generating means, said second time base generating means and video signal receiving means, each said sampling spot gate being associated with one of said preselected sampling spots, and each said sampling spot gate furnishing an output signal upon the simultaneous occurrence at its inputs of a signal from said first time base generating means, a signal from said second time base generating means, and a video signal indicating the presence of an image in the sampling spot associated with said sampling spot gate.

2. A system for identifying intelligence-bearing characters comprising means including a vidicon tube for sensing intelligence-bearing characters and for retaining the images of said characters for a predetermined time, scanning means in said vidicon tube for scanning said images retained on said vidicon tube and for furnishing video signals indicative of the characters scanned, means for interpreting said video signals to provide corresponding output signals indicative of the characters scanned, each character image area on said vidicon tube being divided into a plurality of sampling spots, and wherein said interpreting means includes means for determining whether an image is present in preselected sampling spots in said area and means for comparing the determined conditions of said preselected sampling spots with known conditions of said spots peculiar to each character, and timing means for generating gating signals for said video signals so that the video signals from preselected sampling spots only are examined, said sampling spots occurring in rows and columns and wherein said timing means includes first time base generating means for providing a signal indicative of the column in which the sampling spot presently being scanned by said scanning means occurs and second time base generating means for providing a signal indicative of the row in which the sampling spot presently being scanned occurs, a plurality of sampling spot gates, each having its inputs connected to said first time base generating means, said second time base generating means and video signal receiving means, each said sampling spot gate being associated with one of said preselected sampling spots, and each said sampling spot gate furnishing an output signal upon the simultaneous occurrence at its inputs of a signal from said first time base generating means, a signal from said second time base generating means, a video signal indicating the presence of an image in the sampling spot associated with said sampling spot gate, and memory means connected to the outputs of said sampling spot gates to store output signals received from said sampling spot gates until said scanning means has scanned all of said preselected sampling spots within a given character image area.

3. A system for identifying intelligence-bearing characters comprising means including a vidicon tube for sensing intelligence-bearing characters and for retaining the images of said characters for a predetermined time, scanning means in said vidicon tube for scanning said images retained on said vidicon tube and for furnishing video signals indicative of the characters scanned, means for interpreting said video signals to provide corresponding output signals indicative of the characters scanned, each character image area on said vidicon tube being divided into a plurality of sampling spots, and wherein said interpreting means includes means for determining whether an image is present in preselected sampling spots in said area and means for comparing the determined conditions of said preselected sampling spots with known conditions of said spots peculiar to each character, and timing means for generating gating signals for said video signals so that the video signals from preselected sampling spots only are examined, said sampling spots occurring in rows and columns and wherein said timing means includes first time base generating means for providing a signal indicative of the column in which the sampling spot presently being scanned by said scanning means occurs and second time base generating means for providing a signal indicative of the row in which the sampling spot presently being scanned occurs, a plurality of sampling spot gates, each having its inputs connected to said first time base generating means, said second time base generating means and video signal receiving means, each said sampling spot gate being associated with one of said preselected sampling spots, and each said sampling spot gate furnishing an output signal upon the simultaneous occurrence at its inputs of a signal from said first time base generating means, a signal from said second time base generating means, a video signal indicating the presence of an image in the sampling spot associated with said sampling spot gate, memory means connected to the outputs of said sampling spot gates to store output signals received from said sampling spot gates until said scanning means has scanned all of said preselected sampling spots within a given character image area, and decoding means is connected to said memory means for decoding the output signals from said sampling spot gates and for providing an output signal indicative of the character image scanned in accordance with a preselected combination of the conditions of said sampling spot gates.

4. A system for identifying intelligence-bearing characters comprising means including a vidicon tube for sensing intelligence-bearing characters and for retaining the images of said characters for a predetermined time, scanning means in said vidicon tube for scanning said images retained on said vidicon tube and for furnishing video signals indicative of the characters scanned, means for interpreting said video signals to provide corresponding output signals indicative of the characters scanned, and means are provided for effectively erasing any prior image from the vidicon tube before the vidicon tube is allowed to sense intelligence-bearing characters to be read.

5. A system for identifying intelligence-bearing characters comprising means including a vidicon tube for sensing intelligence-bearing characters and for retaining the images of said characters for a predetermined time, scanning means in said vidicon tube for scanning said images retained on said vidicon tube and for furnishing video signals indicative of the characters scanned, means for interpreting said video signals to provide corresponding output signals indicative of the characters scanned, and means are provided for effectively erasing any prior image from the vidicon tube before the vidicon tube is allowed to sense intelligence-bearing characters to be read, said erasing means including a shutter mechanism for preventing intelligence-bearing characters from being sensed by said vidicon tube until the face of said vidicon tube has been scanned horizontally at least twice by said scanning means after the scanning operation has been initiated.

6. A system for identifying intelligence-bearing characters comprising means for sensing intelligence-bearing characters and for retaining the images of said characters for a predetermined time, each character image area on said retaining means being divided into a plurality of sampling spots which occur in rows and columns, scanning means for scanning said images and for furnishing signals indicative of whether an image is present in preselected sampling spots in said character image area, first time base generating means for providing a signal indicative of the column in which the sampling spot presently being scanned by said scanning means occurs, second time base generating means for providing a signal indicative of the row in which the sampling spot presently being scanned occurs, a plurality of sampling spot gates, each having a first input connected to said first time base generating means, a second input connected to said second time base generating means, and a third input connected to said signal furnishing means, each sampling spot gate being associated with one of said preselected sampling spots and furnishing an output signal upon the simultaneous occurrence at its inputs of a signal from said first time base generating means, a signal from said second time base generating means, and a signal from said signal furnishing means indicating the presence of an image in the sampling spot associated with said sampling spot gate, memory means for storing output signals received from said sampling spot gates until said scanning means has scanned all of said preselected sampling spots within a given character image area, and decoding means for decoding the output signals from said sampling spot gates and for providing an output signal indicative of the character image scanned in accordance with a preselected combination of the conditions of said sampling spot gates.

7. A system for identifying intelligence-bearing characters comprising means including a vidicon tube for sensing intelligence-bearing characters and for retaining the images of said characters for a predetermined time, each character image area on said vidicon tube being divided into a plurality of sampling spots which occur in rows and columns, scanning means in said vidicon tube for scanning said images and for furnishing video signals indicative of whether an image is present in preselected sampling spots in said character image area, first time base generating means for providing a signal indicative of the column in which the sampling spot presently being scanned by said scanning means occurs, second time base generating means for providing a signal indicative of the row in which the sampling spot presently being scanned occurs, a plurality of sampling spot gates, each having a first input connected to said first time base generating means, a second input connected to said second time base generating means, and a third input connected to said video signal furnishing means, each sampling spot gate being associated with one of said preselected sampling spots and furnishing an output signal upon the simultaneous occurrence at its inputs of a signal from said first time base generating means, a signal from said second time base generating means, and a video signal indicating the presence of an image in the sampling spot associated with said sampling spot gate, memory means for storing output signals received from said sampling spot gates until said scanning means has scanned all of said preselected sampling spots within a given character image area, and decoding means for decoding the output signals from said sampling spot gates and for providing an output signal indicative of the character image scanned in accordance with a preselected combination of the conditions of said sampling spot gates.

8. A system according to claim 6 wherein means are provided for resetting said first time base generating means in the event a video signal indicating the presence of an image at one of said sampling spots is detected on the first vertical scan over a character image and no such video signal is detected on a subsequent vertical scan over said character image.

9. A system according to claim 6 having means for providing a first timing signal at the beginning of a vertical scan, means for providing a second timing signal at the end of said vertical scan, and means for sending a reset signal to said first time base generating means if no video signals indicating the presence of an image at one of said sampling spots are received between said first and said second timing signals.

10. A system for identifying intelligence-bearing characters comprising means including a television camera tube for sensing intelligence-bearing characters and for retaining the images of said characters for a predetermined time, scanning means in said television camera tube for scanning said images retained on said television camera tube and for furnishing video signals indicative of the characters scanned, means for interpreting said video signals to provide corresponding output signals indicative of the characters scanned, each character image area on said television camera tube being divided into a plurality of sampling spots, and wherein said interpreting means includes means for determining whether an image is present in preselected sampling spots in said area and means for comparing the determined conditions of said preselected sampling spots with known conditions of said spots peculiar to each character, and timing means for generating gating signals for said video signals so that the video signals from preselected sampling spots only are examined, said sampling spots occurring in rows and column and wherein said timing means includes first time base generating means for providing a signal indicative of the column in which the sampling spot presently being scanned by said scanning means occurs and second time base generating means for providing a signal indicative of the row in which the sampling spot presently being scanned occurs, a plurality of sampling spot gates, each having its inputs connected to said first time base generating means, said second time base generating means and video signal receiving means, each said sampling spot gate being associated with one of said preselected sampling spots, and each said sampling spot gate furnishing an output signal upon the simultaneous occurrence at its inputs of a signal from said first time base generating means, a signal from said second time base generating means, and a video signal indicating the presence of an image in the sampling spot associated with said sampling spot gate.

11. A system for identifying intelligence-bearing characters comprising means including a television camera tube for sensing intelligence-bearing characters and for retaining the images of said characters for a predetermined time, scanning means in said television camera tube for scanning said images retained on said television camera tube and for furnishing video signals indicative of the characters scanned, means for interpreting said video signals to provide corresponding output signals indicative of the characters scanned, and means are provided for effectively erasing any prior image from the television camera tube before the television camera tube is allowed to sense intelligence-bearing characters to be read.

12. A system for identifying intelligence-bearing characters comprising means including a television camera tube for sensing intelligence-bearing characters and for retaining the images of said characters for a predetermined time, scanning means in said television camera tube for scanning said images retained on said television camera tube and for furnishing video signals indicative of the characters scanned, means for interpreting said video signals to provide corresponding output signals indicative of the characters scanned, and means are provided for effectively erasing any prior image from the television camera tube before the television camera tube is allowed to sense intelligence-bearing characters to be read, said erasing means including a shutter mechanism for preventing intelligence-bearing characters from being sensed by said television camera tube until the face of said television camera tube has been scanned horizontally at least twice by said scanning means after the scanning operation has been initiated.

(References on following page)

References Cited in the file of this patent

UNITED STATES PATENTS

| | | |
|---|---|---|
| 2,738,499 | Sprick | Mar. 13, 1956 |
| 2,787,724 | Webley | Apr. 2, 1957 |
| 2,816,954 | Huffman | Dec. 17, 1957 |
| 2,838,602 | Sprick | June 10, 1958 |
| 2,894,247 | Relis | July 7, 1959 |
| 2,928,074 | Sutter | Mar. 8, 1960 |
| 2,932,006 | Glauberman | Apr. 5. 1960 |
| 2,956,117 | Ernst et al. | Oct. 11, 1960 |
| 2,978,537 | Kruse et al. | Apr. 4, 1961 |
| 2,978,675 | Highleyman | Apr. 4, 1961 |
| 2,985,065 | Haybes et al. | May 23, 1961 |
| 3,016,518 | Taylor | Jan. 9, 1962 |
| 3,025,495 | Endres | Mar. 13, 1962 |